(12) United States Patent  
Chen et al.

(10) Patent No.: US 9,134,781 B2
(45) Date of Patent: Sep. 15, 2015

(54) INQUIRY SYSTEM OF POWER BANK

(71) Applicant: TENNRICH INTERNATIONAL CORP., Taoyuan Hsieh (TW)

(72) Inventors: Shih-Hui Chen, Taoyuan Hsieh (TW); Chin-Tien Lin, Taoyuan Hsieh (TW)

(73) Assignee: TENNRICH INTERNATIONAL CORP., Taoyuan (TW)

( * ) Notice: Subject to any disclaimer, the term of this patent is extended or adjusted under 35 U.S.C. 154(b) by 378 days.

(21) Appl. No.: 13/833,010

(22) Filed: Mar. 15, 2013

(65) Prior Publication Data

US 2013/0205159 A1 Aug. 8, 2013

Related U.S. Application Data

(63) Continuation-in-part of application No. 12/202,875, filed on Sep. 2, 2008, now abandoned.

(51) Int. Cl.
| | | |
|---|---|---|
| *G01D 3/00* | (2006.01) | |
| *G06F 1/28* | (2006.01) | |
| *G06F 1/26* | (2006.01) | |
| *H01M 10/42* | (2006.01) | |

(52) U.S. Cl.
CPC *G06F 1/28* (2013.01); *G06F 1/263* (2013.01); *H01M 10/42* (2013.01)

(58) Field of Classification Search
CPC ........... G06F 1/28; G06F 1/263; H01M 10/42
USPC ......................................................... 702/108
See application file for complete search history.

(56) References Cited

U.S. PATENT DOCUMENTS

| | | | |
|---|---|---|---|
| 2007/0143507 A1* | 6/2007 | Chen et al. ...................... | 710/74 |
| 2008/0233469 A1* | 9/2008 | Drozdz et al. .................. | 429/61 |
| 2012/0130661 A1* | 5/2012 | Hagimori et al. ............... | 702/63 |
| 2014/0253051 A1* | 9/2014 | Hu et al. ........................ | 320/163 |

* cited by examiner

*Primary Examiner* — Tung S Lau
*Assistant Examiner* — Xiuquin Sun

(57) ABSTRACT

The present invention discloses an inquiry system having a database and a first testing module as well as a memory unit, a second testing module and a maximum power efficiency control unit built in a power bank. In addition to the information exchange performed by the first testing module through an external computer, the built-in second testing can perform information exchange with a device to be charged (such as a handheld electronic device) directly. Meanwhile, the charging time of the power back can be reduced through the maximum power efficiency control unit.

20 Claims, 12 Drawing Sheets

INQUIRY SYSTEM OF POWER BANK

BACKGROUND OF THE INVENTION (a) Field of the Invention

The present invention relates to a computer inquiry system, and more particularly to an inquiry system provided for consumers to obtain specification and teaching content related data of a power bank by using a computer or a handheld electronic device, and perform a battery function test to a connected power bank.

(b) Description of the Related Art

As digital electronic products become necessary equipments, we need digital electronic products in our daily life, tour, business trip or work. For example, we use a digital camera, a digital camcorder or a MP4 player in a tour, and a personal digital assistant or a notebook computer in a business trip, and these digital electronic products bring us tremendous convenience.

As to the digital electronic products used at a place without an access of utility power, the duration of battery become a major issue to users. Furthermore, the battery made by the original manufacturer is very expensive, and the battery duration is very short, the power supply becomes a drawback of the electronic products particularly when the battery cannot be recharged, and thus these digital electronic products cannot be utilized fully, and a power bank is developed and introduced to the market.

In general, a power bank includes at least one built-in rechargeable battery, and a USB cable is connected between the power bank and an electronic device for supplying power to the electronic device. In other words, the power bank is an external device with power storage and basic transmission functions, and increasingly more added-on functions are developed from the power bank.

Since the power bank integrates many other added-on functions, manufacturers attempt to introduce and provide more specifications and models of power banks for the choice and use by consumers, and a manufacturer may produce several different models of power banks, and their operations may vary according to the different added-on functions.

Further, after the built-in rechargeable battery of the power bank has gone through repeated charging and discharging processes, the battery function may be deteriorated, and thus it is an important subject for manufacturers to develop a power bank with an inquiry system provided for consumers to obtain the related data of the power bank and know about the battery function of the power bank.

SUMMARY OF THE INVENTION

In view of the shortcomings of the prior art, it is a primary objective of the present invention to provide an inquiry system for consumers to use a computer or a handheld electronic device to obtain specification and teaching content related data of a power bank and further perform a battery function test of the power bank.

To achieve the foregoing objective, the inquiry system comprises a database and a first testing module, as well as a memory unit, a second testing module and a maximum power efficiency control unit built in a power bank, wherein the database and the first testing module can be built in a computer by downloading them via a network or reading them from an optical disk, wherein the database further comprises a basic data inquiry unit, a how-to-use data unit, and a battery function testing unit.

In addition to an information exchange performed by the first testing module in an external computer, the information exchange with a device to be charged (such as a handheld electronic device) can be performed directly by using the second testing module. Meanwhile, the maximum power efficiency control unit can reduce the charging time of the power bank.

DETAILED DESCRIPTION OF THE PREFERRED EMBODIMENTS

Figure 1:
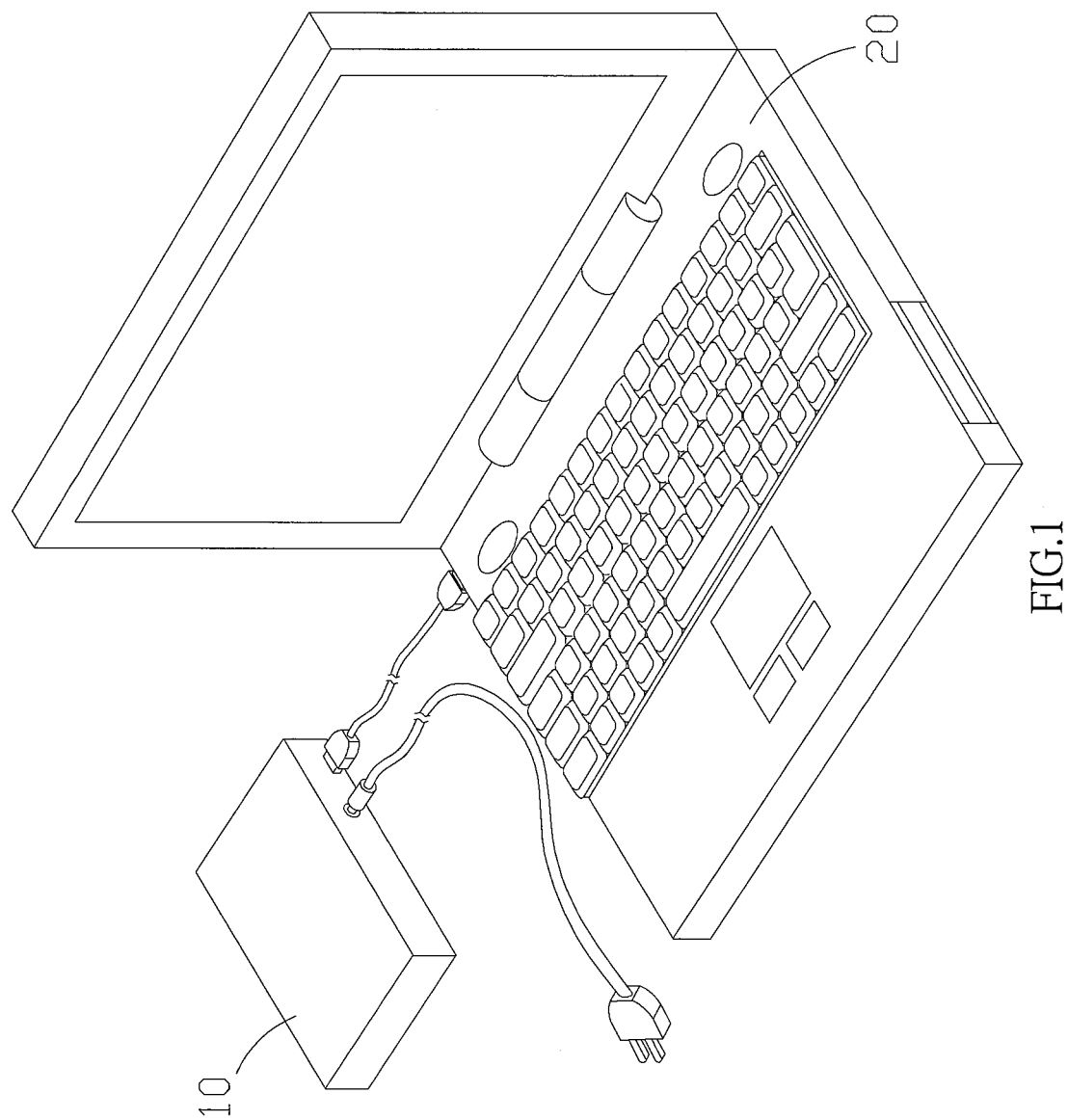
FIG. 1 is a schematic view of using a power bank of the invention.

With reference to FIG. 1 for an inquiry system in accordance with a first preferred embodiment of the present invention, the inquiry system is provided for consumers to use a computer 20 to obtain specification and teaching content related data from a power bank 10 and further perform a battery function test for the connected power bank 10.

Figure 2:
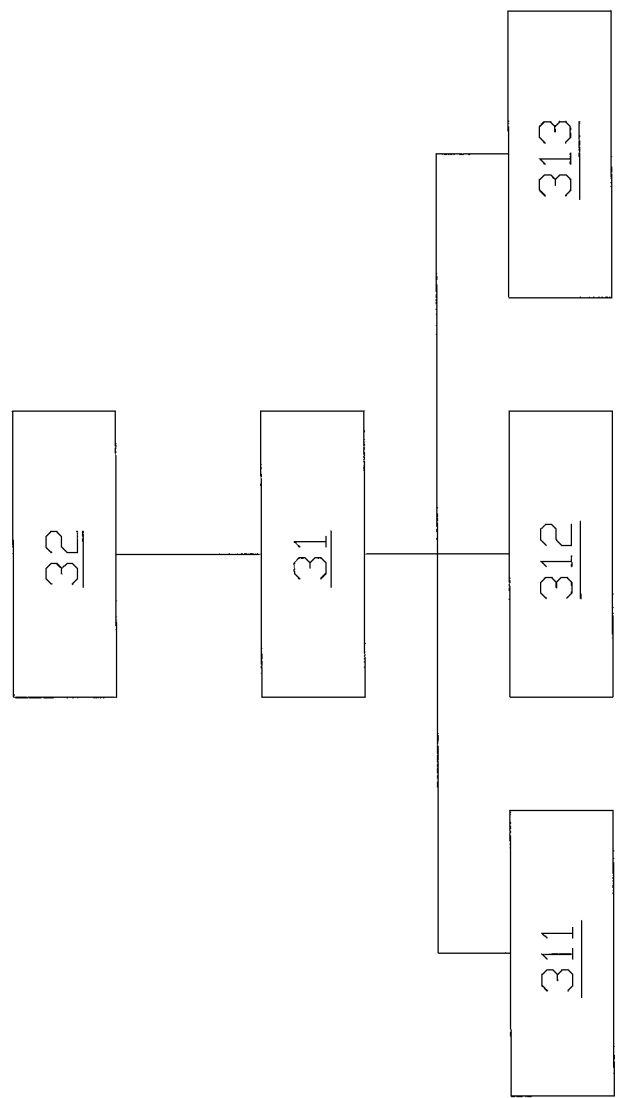
FIG. 2 is a schematic view of a partial structure of an inquiry system of the present invention.

With reference to FIG. 2 as well, the inquiry system comprises a database 31 and a first testing module 32.

The database 31 and the first testing module 32 are integrated into system software, and the system software can be built directly into a website, or provided for downloading from the website or reading from an optical disk into a computer by users. The database 31 further comprises a basic data inquiry unit 311, a how-to-use data unit 312, and a battery function testing unit 313.

In the first preferred embodiment of an inquiry system of the present invention as shown in FIG. 1, data related to the specification and teaching content of the power bank 10 can be obtained by using the computer 20, and a battery function test of a connected power bank 10 can be performed.

With reference to FIG. 2, the inquiry system comprises a database 31 and a first testing module 32, wherein the database 31 and the first testing module 32 can be integrated into a system software, and the system software can be built in a website directly or built in a computer by downloading the system software via network or reading the system software from an optical disk. The database 31 further comprises a basic data inquiry unit 311, a how-to-use data unit 312, and a battery function testing unit 313.

Figure 3:
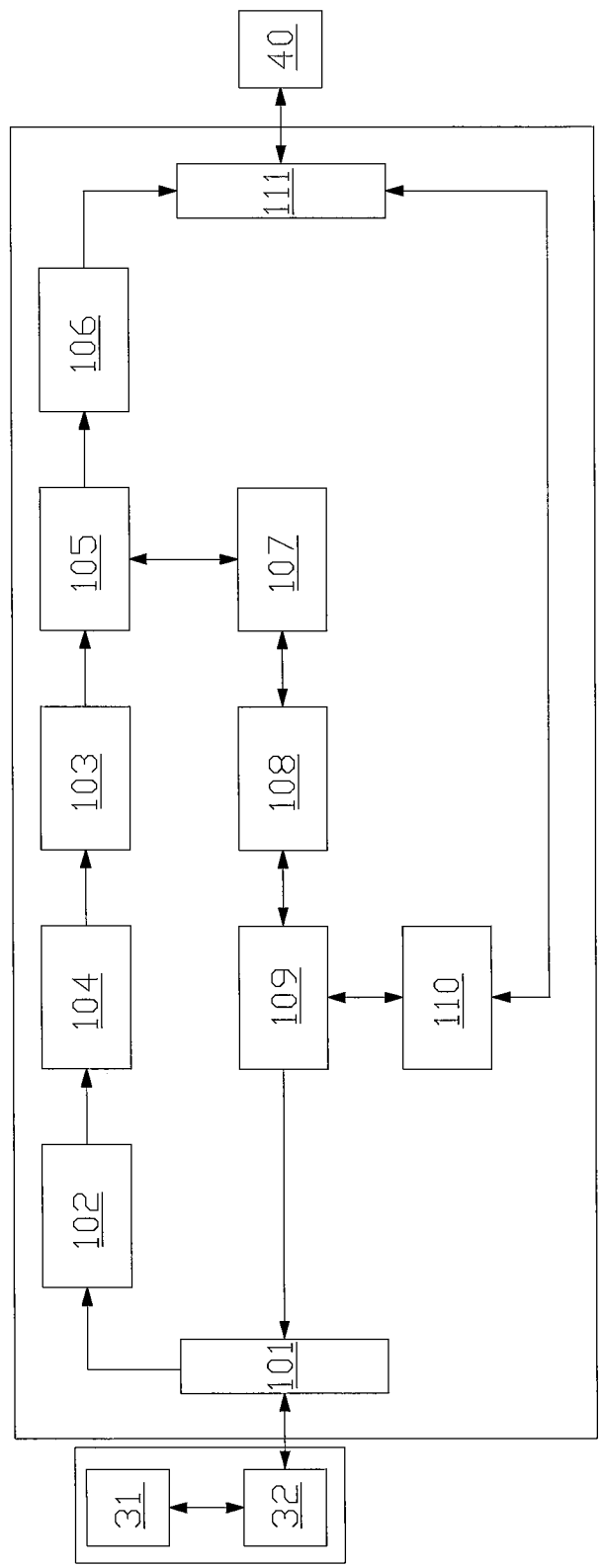
FIG. 3 is a schematic view of a structure of a power bank of the present invention.

The power bank 10 as shown in FIG. 3 comprises a first transmission interface 101, a power input unit 102, a battery unit 103, a maximum power efficiency control unit 104, a power management unit 105, a power output unit 106, a second testing module 107, a data retrieving unit 108, a memory unit 109, a control unit 110 and a second transmission interface 111.

The first transmission interface 101 is provided for coupling a power supply device (which is a computer 20 in this preferred embodiment).

The power input unit 102 is coupled to the first transmission interface 101 for receiving power inputted by the power supply device.

The battery unit 103 is provided for receiving and storing the power of the power input unit 102, wherein the battery unit 103 is a battery.

The maximum power efficiency control unit 104 is coupled between the power input unit 102 and the battery unit 103 and provided for calculating an internal resistance of the battery unit 103 and a corresponding compensation voltage thereof according to a dynamic voltage value and a dynamic current value of the inputted electric power, and performing a charge in a constant-current mode to reducing the charging time.

The power management unit 105 is coupled to the battery unit 103 for monitoring and controlling charge and discharge statuses of the battery unit 103.

The power output unit 106 is coupled to the power management unit 105 for receiving a power output of the battery unit 103.

The second testing module 107 is coupled to the power management unit 105 for receiving parameter data monitored and controlled by the power management unit 105.

The data retrieving unit 108 is coupled to the second testing module 107 for retrieving parameter data from the second testing module 107.

The memory unit 109 is coupled to the data retrieving unit 108 and the first transmission interface 101 for storing the parameter data and the charge information, and performing an information exchange with the database 31 and the first testing module 32 through the first transmission interface 101.

The control unit 110 is coupled to the memory unit 109 for receiving and computing the parameter data.

Figure 4:
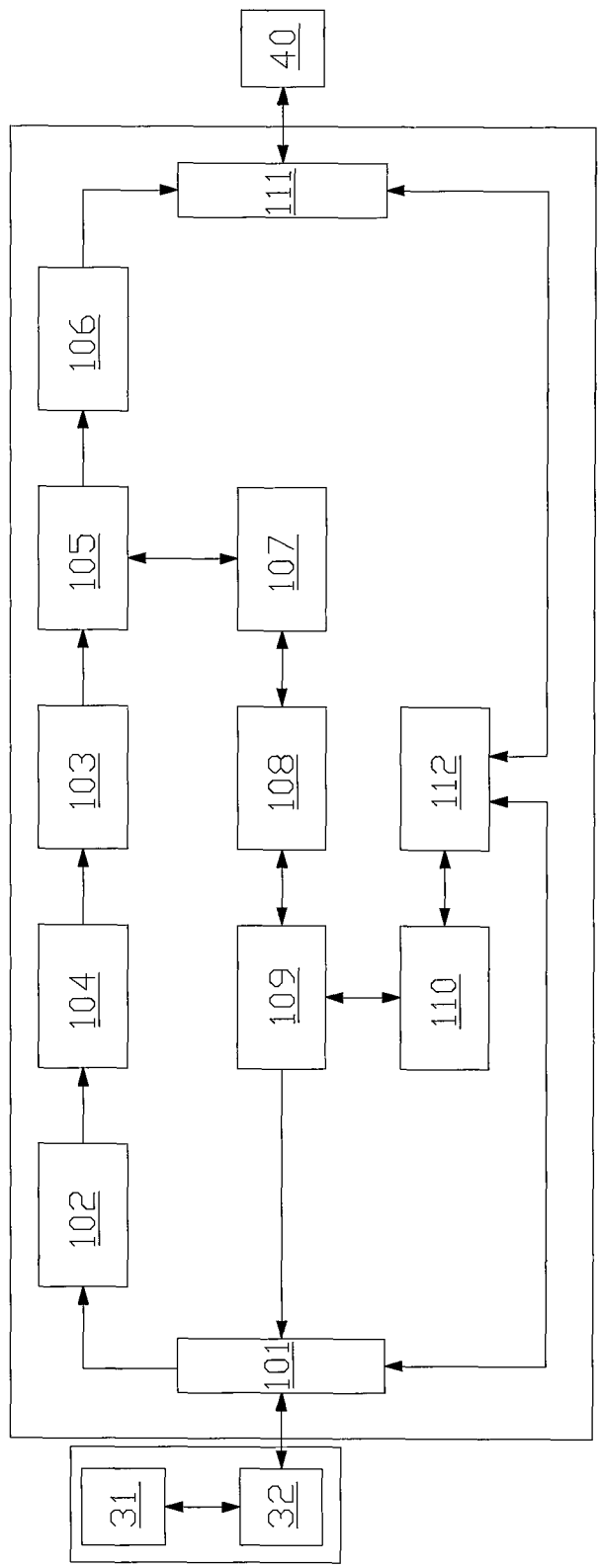
FIG. 4 is a schematic view of another structure of a power bank of the present invention.

The second transmission interface 111 is coupled to the power output unit 106 and control unit 110 and provided for connecting a device to be charged 40, supplying power by the power output unit 106, and performing information exchange through the control unit 110. In FIG. 4, the inquiry system of the present invention further comprises a data communication unit 112 coupled between the control unit 110 and the second transmission interface 111, and the data communication unit 112 is coupled to the first transmission interface 101, so that the memory unit 109 is coupled to the first transmission interface 101 through the control unit 110 and the data communication unit 112.

In FIGS. 1 and 3, the inquiry system performs information exchange by the memory unit 109 through the computer 20 and the first testing module 32 and the database 31 in the system software, so that consumers can obtain data related to the specification and teaching content of the power bank 10 by a computer, and a battery test function of the power bank 10 can be performed.

In a practical application, a consumer enters into a website having an inquiry system directly via a network connection and inputs a related product number, the user can obtain specification and teaching content related data of the power bank, or the consumer enters directly into a website having an inquiry system via a network connection and downloads a system software of the inquiry system, such that after the system software is installed, the consumer enters a related product number and obtains the related specification and teaching content of the power bank, or the consumer uses an optical disk of the system software of the inquiry system for installing the system software, and inputs a related product number to obtain the specification and teaching content related data of the power bank.

Since the inquiry system builds a basic data inquiry unit and a how-to-use data unit in the database, therefore consumers can obtain the detailed product information and the complete operating demonstration and description of a product. Particularly, the battery function testing unit and the detection module can be operated to give the information about the battery function of a connected power bank and allow users to get ready for replacing or charging the battery in advance.

Figure 5:
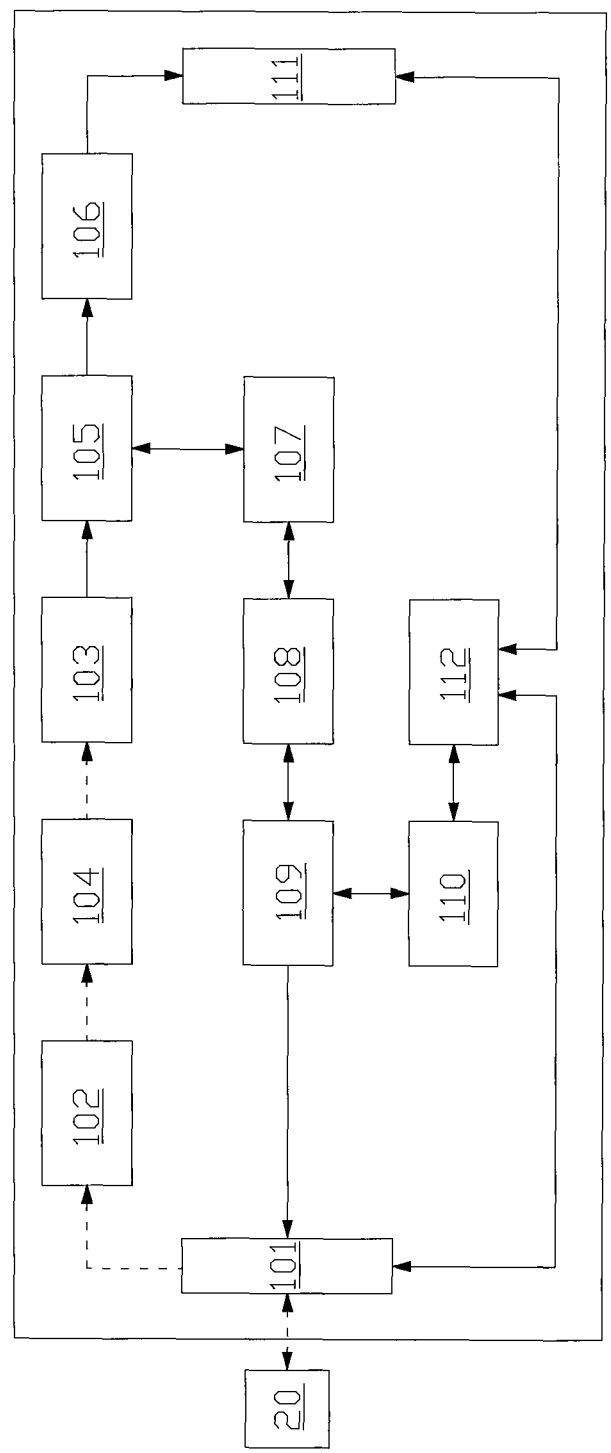
FIG. 5 is a flow chart of charging a power back by a computer in accordance with the present invention.

The power bank 10 can be connected to the computer 20 while supplying power. In FIG. 5, the dotted line of the figure represents a power transmission path, and the power of the computer 20 is transmitted from the first transmission interface 101 to the power input unit 102. When the maximum power efficiency control unit 104 detects that a power is inputted to the power input unit 102, a control step of charging with the maximum charging efficiency is carried out.

Figure 6A:
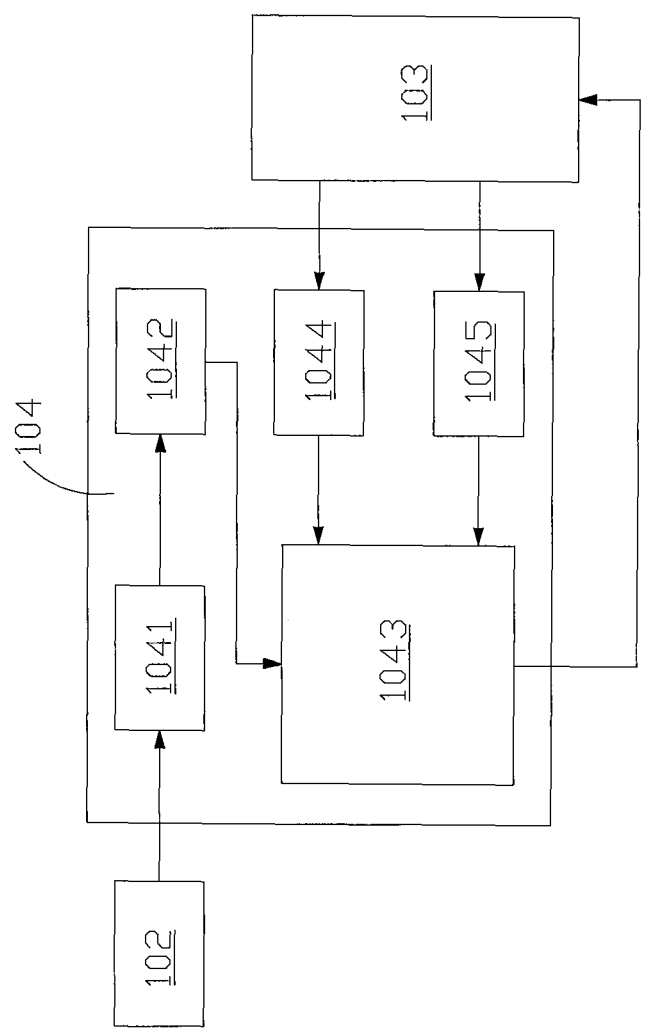
FIG. 6A is a schematic block diagram of a maximum power efficiency control unit of the present invention.

In FIG. 6A, the maximum power efficiency control unit 104 comprises a charge input circuit 1041, a charge management circuit 1042, a computing unit 1043, a charge voltage sampling circuit 1044 and a charge current sampling circuit 1045, wherein the charge input circuit 1041 is coupled to the power input unit 102 and charge management circuit 1042, and the charge management circuit 1042, the computing unit 1043, the charge voltage sampling circuit 1044 and the charge current sampling circuit 1045 are coupled to the battery unit 103, and the computing unit 1043 is coupled to the charge management circuit 1042, the charge voltage sampling circuit 1044 and the charge current sampling circuit 1045.

Figure 6B:
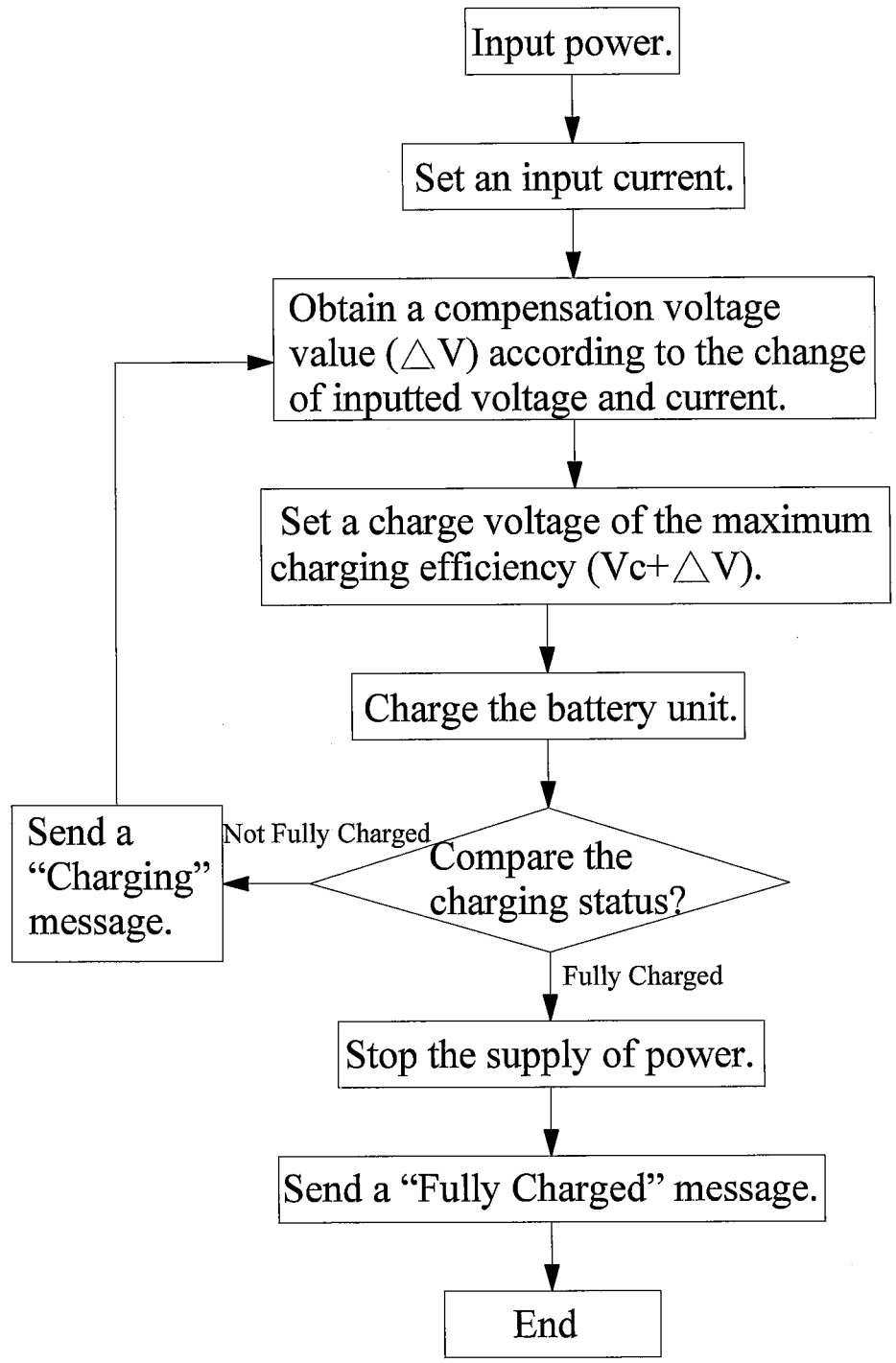
FIG. 6B is a flow chart of a procedure of controlling a maximum power efficiency control unit of the present invention.

With reference to FIG. 6B as well, the charge management circuit 1042 presets an input current, and then the charge voltage sampling circuit 1044 and the charge current sampling circuit 1045 obtain inputted dynamic voltage and current, and the computing unit 1043 computes an internal resistance and its corresponding compensation voltage value ($\Delta V$) of the battery unit 103 according to the change of dynamic voltage and current values. A charge voltage of the maximum charging efficiency (Vc+$\Delta V$) is set according to the compensation voltage value ($\Delta V$), and a constant current (CC) mode is used for charging the battery unit 103. During the charging process, the charge statuses are compared. If the comparison result shows that the battery unit 103 is not fully charged, then the obtained compensation voltage value will be used for forming the steps that follow. If the comparison result shows that the battery is fully charged, then the supply of the input power for charging will be stopped to terminate the charging of the battery unit 103.

Figure 6C:
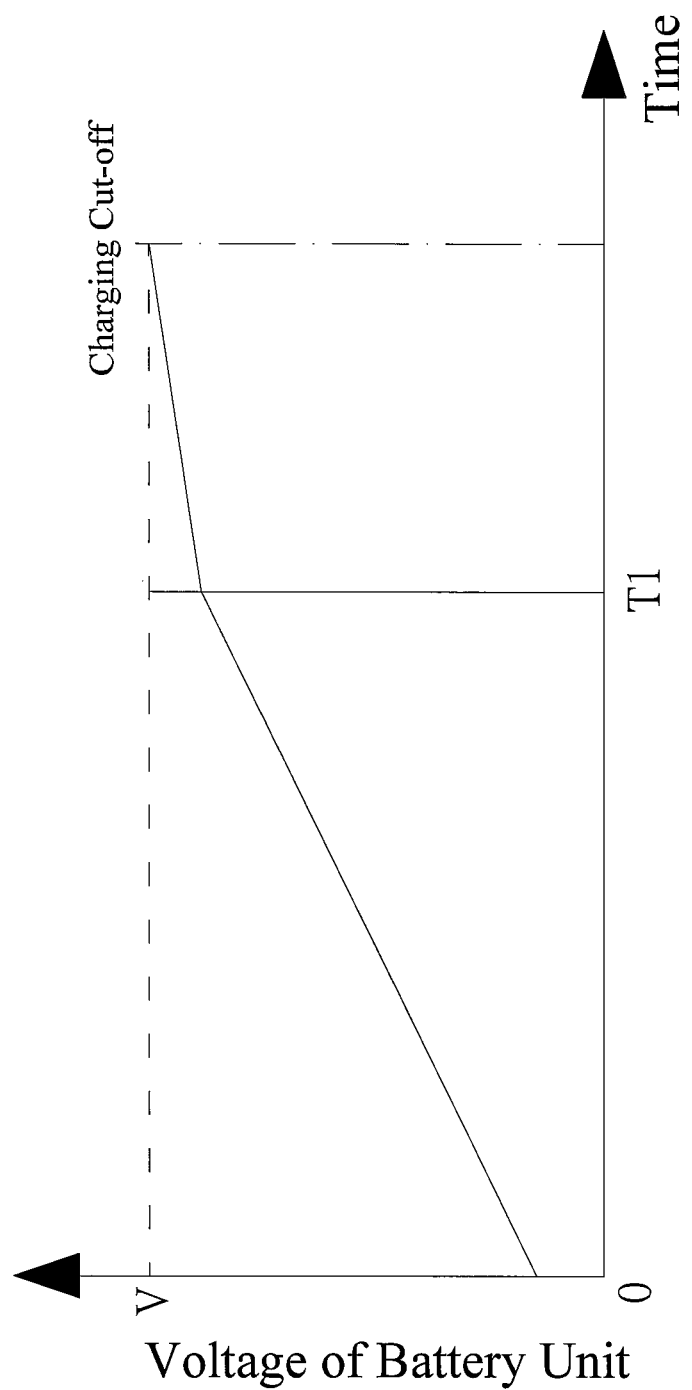
FIG. 6C is a voltage versus time graph of a conventional method of charging by a constant-current constant-voltage mode.
Figure 6D:
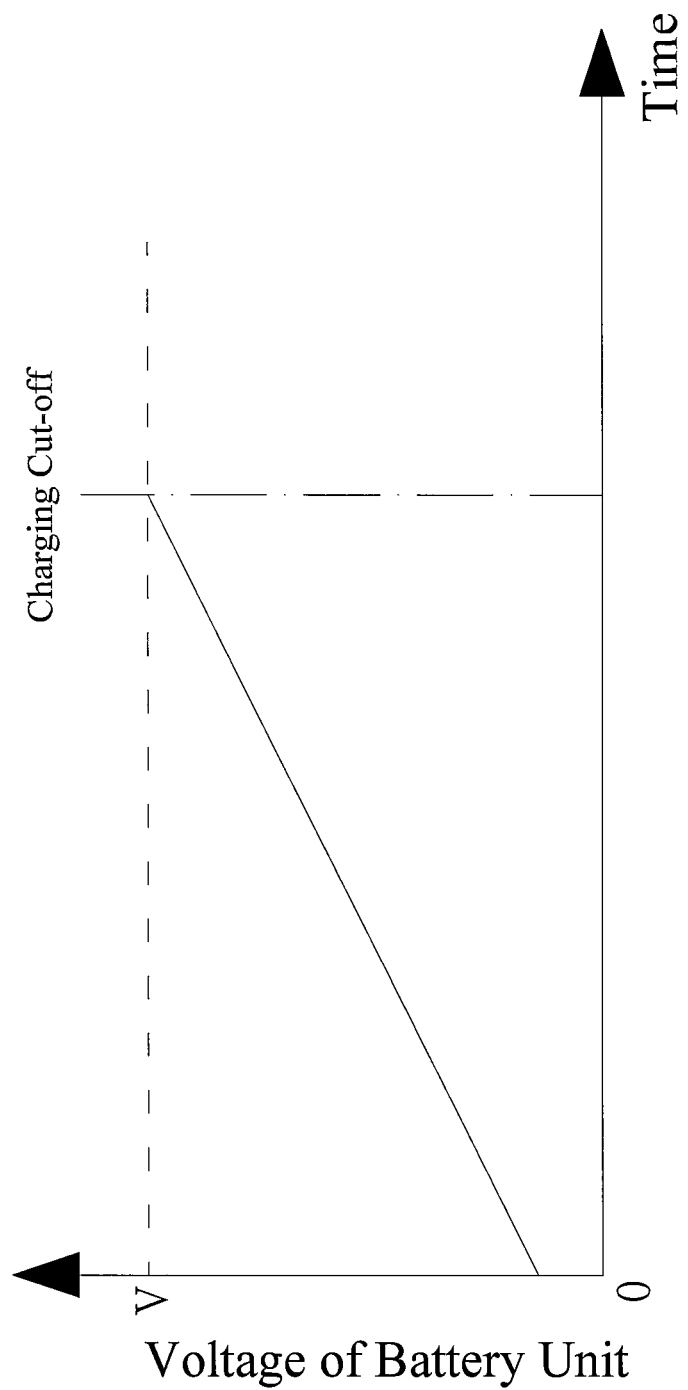
FIG. 6D is a voltage versus time graph of a method of charging by a constant-current constant-voltage mode in accordance with the present invention.

With reference to FIG. 6C for a conventional method of charging a battery by a constant-current constant-voltage (CC-CV) mode, a constant current and a constant voltage are used for the charge at the beginning, and after the power is charged to a certain voltage (or after the time T1 as shown in FIG. 6C), a constant-voltage (CV) mode is used for the charge instead until a predetermined charge voltage (V) is reached, and thus the charge cut-off time is relatively longer. For simplicity, the present invention just uses the constant-current (CC) mode for the charge as shown in FIG. 6D, and when the predetermined charge voltage (V) is reached, the charge cut-off time is relatively shorter.

Figure 7:
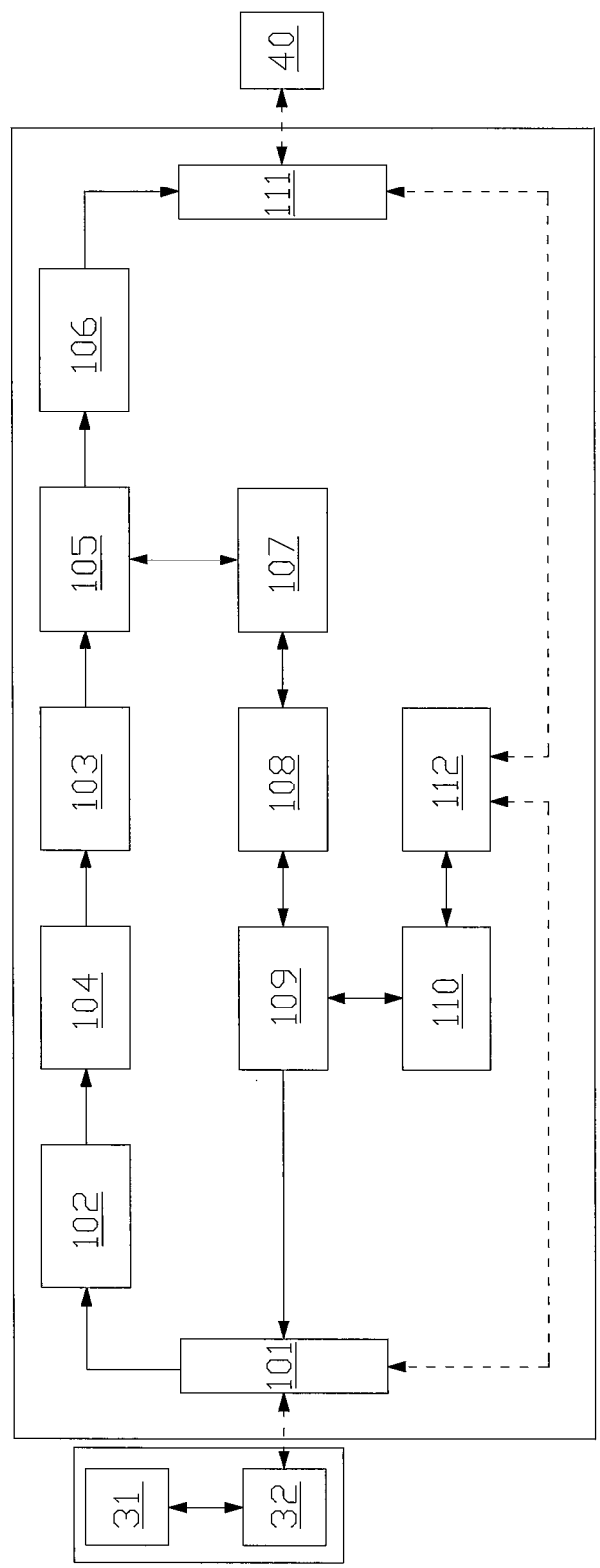
FIG. 7 is a flow chart of the data transmission between a computer and a device to be charged in accordance with the present invention.

When the power bank 10 is connected to the computer 20 and the device to be charged 40, and the device to be charged 40 is a handheld electronic device (such as a mobile phone, a digital camera, a tablet PC or a PDA) as shown in FIG. 7, data can be transmitted between the computer 20 and the device to be charged 40, wherein the dotted line of the figure represents the data transmission path, and data stored in the computer 20 can be transmitted through the first transmission interface 101 and the data communication unit 112 to the second transmission interface 111, and then transmitted to the device to be charged 40.

Figure 8:
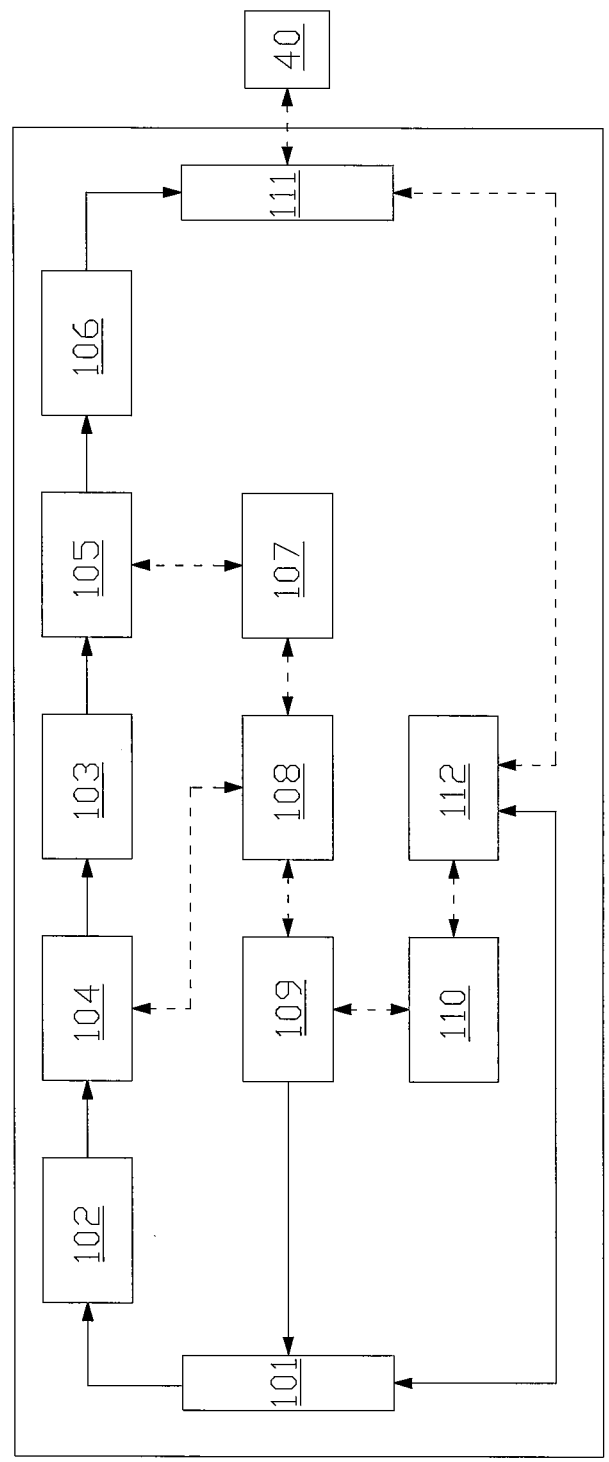
FIG. 8 is a flow chart of the data transmission between a power bank and a device to be charged in accordance with the present invention.

When the power bank 10 is connected to the device to be charged 40, the device to be charged 40 can be charged while transmitting data as shown in FIG. 8, wherein the dotted line represents the data transmission path, and the parameter data obtained by the second testing module 107 can be retrieved by the data retrieving unit 108 into the memory unit 109, and the control unit 110 transmits the aforementioned parameter data to the device to be charged 40 through the second transmission interface 111 by the data communication unit 112, and the battery function of the connected power bank can be displayed to let uses get ready for replacing or charging the battery in advance. Of course, the maximum power efficiency control unit 104 can be coupled to the data retrieving unit 108, such that the data retrieving unit 108 can retrieve charge information (such as the charge level or the remaining charging time) of the maximum power efficiency control unit 104, and transmit the charge information to the device to be charged 40, and the device to be charged 40 can display the charge information.

Figure 9:
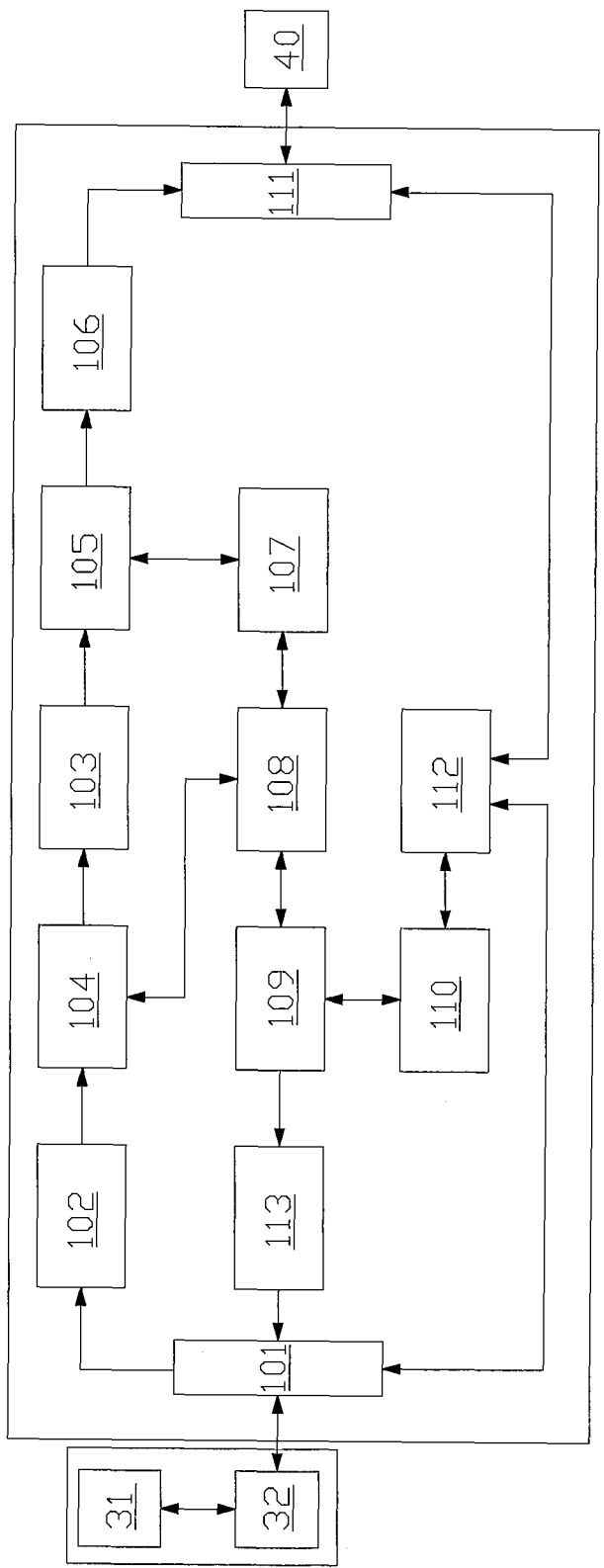
FIG. 9 is a schematic view of another structure of a power bank of the present invention.

Another preferred embodiment as shown in FIG. 9 further comprises a display unit 113 coupled between the first transmission interface 101 and the memory unit 110 for displaying the charge information. Of course, the memory unit of the aforementioned embodiments can be connected to a database for compiling and storing the parameter in the memory unit.

We claim:

1. An inquiry system of a power bank, having a system software integrated with a database and a first testing module, and the power bank being connectable to the system software and comprising:
   a first transmission interface, provided for coupling a power supply device;
   a power input unit, coupled to the first transmission interface, for receiving electric power inputted by the power supply device;
   a battery unit, for receiving and storing the power of the power input unit;
   a maximum power efficiency control unit, coupled between the power input unit and the battery unit, for calculating an internal resistance of the battery unit and a corresponding compensation voltage thereof according to a dynamic voltage value and a dynamic current value of the inputted electric power, and performing a charge in a constant-current mode to reducing the charging time;
   a power management unit, coupled to the battery unit, for monitoring and controlling charge and discharge statuses of the battery unit;
   a power output unit, coupled to the power management unit, for receiving a power output of the battery unit;
   a second testing module, coupled to the power management unit, for receiving parameter data monitored and controlled by the power management unit;
   a data retrieving unit, coupled to the second testing module, for retrieving the parameter data from the second testing module;
   a memory unit, coupled to the data retrieving unit and the first transmission interface, for storing the parameter data and the charge information, and performing an information exchange with the database and the first testing module through the first transmission interface;
   a control unit, coupled to the memory unit, for receiving and computing the parameter data; and
   a second transmission interface, coupled to the power output unit and the control unit, for coupling a device to be charged, supplying power by the power output unit, and performing an information exchange through the control unit.

2. The inquiry system of a power bank according to claim 1, further comprising a data communication unit coupled between the control unit and second transmission interface.

3. The inquiry system of a power bank according to claim 2, wherein the data communication unit is coupled to the first transmission interface, such that the memory unit is coupled to the first transmission interface through the control unit and the data communication unit.

4. The inquiry system of a power bank according to claim 1, wherein the memory unit is further connected to a database.

5. The inquiry system of a power bank according to claim 1, wherein the database further comprises a basic data inquiry unit, a how-to-use data unit, and a battery function testing unit.

6. The inquiry system of a power bank according to claim 1, wherein the system software is built into the power supply device by downloading the system software from a network.

7. The inquiry system of a power bank according to claim 6, wherein the power supply device is a computer.

8. The inquiry system of a power bank according to claim 1, wherein the system software is built into the power supply device by reading the system software from an optical disk.

9. The inquiry system of a power bank according to claim 8, wherein the power supply device is a computer.

10. The inquiry system of a power bank according to claim 1, wherein the maximum power efficiency control unit comprises a charge input circuit, a charge management circuit, a computing unit, a charge voltage sampling circuit and a charge current sampling circuit, and the charge input circuit is coupled to the power input unit and the charge management circuit, and the charge management circuit, the computing unit, the charge voltage sampling circuit and the charge current sampling circuit are coupled to the battery unit, and the computing unit is coupled to the charge management circuit, the charge voltage sampling circuit and the charge current sampling circuit.

11. An inquiry system of a power bank, having a system software and the power bank being connectable to the system software, and the system software having a database and a first testing module integrated with the system software, and the power bank comprising:
   a first transmission interface, provided for coupling a power supply device;
   a power input unit, coupled to the first transmission interface, for receiving electric power inputted by the power supply device;
   a battery unit, for receiving and storing the power of the power input unit;

a maximum power efficiency control unit, coupled between the power input unit and the battery unit, for calculating an internal resistance of the battery unit and a corresponding compensation voltage thereof according to a dynamic voltage value and a dynamic current value of the inputted electric power, and performing a charge in a constant-current mode to reducing the charging time;

a power management unit, coupled to the battery unit, and for monitoring and controlling charge and discharge statuses of the battery unit;

a power output unit, coupled to the power management unit, for receiving a power output of the battery unit;

a second testing module, coupled to the power management unit, for receiving parameter data monitored and controlled by the power management unit;

a data retrieving unit, coupled to the second testing module and the maximum power efficiency control unit, for retrieving the parameter data from the second testing module, and charge information of the maximum power efficiency control unit;

a memory unit, coupled to the data retrieving unit and the first transmission interface, for storing the parameter data and the charge information, and performing an information exchange with the database and the first testing module through the first transmission interface;

a display unit, coupled between the first transmission interface and the memory unit, for displaying the charge information;

a control unit, coupled to the memory unit, for receiving and computing the parameter data; and a second transmission interface, coupled to the power output unit and the control unit, for coupling a device to be charged, supplying power by the power output unit, and performing an information exchange through the control unit.

12. The inquiry system of a power bank according to claim 11, further comprising a data communication unit coupled between the control unit and second transmission interface.

13. The inquiry system of a power bank according to claim 12, wherein the data communication unit is coupled to the first transmission interface, such that the memory unit is coupled to the first transmission interface through the control unit and the data communication unit.

14. The inquiry system of a power bank according to claim 11, wherein the memory unit is further connected to a database.

15. The inquiry system of a power bank according to claim 11, wherein the database further comprises a basic data inquiry unit, a how-to-use data unit, and a battery function testing unit.

16. The inquiry system of a power bank according to claim 11, wherein the system software is built into the power supply device by downloading the system software from a network.

17. The inquiry system of a power bank according to claim 11, wherein the power supply device is a computer.

18. The inquiry system of a power bank according to claim 11, wherein the system software is built into the power supply device by reading the system software from an optical disk.

19. The inquiry system of a power bank according to claim 11, wherein the power supply device is a computer.

20. The inquiry system of a power bank according to claim 11, wherein the maximum power efficiency control unit comprises a charge input circuit, a charge management circuit, a computing unit, a charge voltage sampling circuit and a charge current sampling circuit, and the charge input circuit is coupled to the power input unit and the charge management circuit, and the charge management circuit, the computing unit, the charge voltage sampling circuit and the charge current sampling circuit are coupled to the battery unit, and the computing unit is coupled to the charge management circuit, the charge voltage sampling circuit and the charge current sampling circuit.

* * * * *